US012418919B2

(12) United States Patent
Hussain et al.

(10) Patent No.: US 12,418,919 B2
(45) Date of Patent: Sep. 16, 2025

(54) METHODS AND SYSTEMS FOR MANAGING RADIO RESOURCES IN WIRELESS COMMUNICATION NETWORK

(71) Applicant: Samsung Electronics Co., Ltd., Suwon-si (KR)

(72) Inventors: Khurram Hussain, Bangalore (IN); Raju Gupta, Bangalore (IN)

(73) Assignee: Samsung Electronics Co., Ltd., Suwon-si (KR)

( * ) Notice: Subject to any disclaimer, the term of this patent is extended or adjusted under 35 U.S.C. 154(b) by 907 days.

(21) Appl. No.: 17/584,128

(22) Filed: Jan. 25, 2022

(65) Prior Publication Data

US 2022/0150954 A1  May 12, 2022

Related U.S. Application Data

(63) Continuation of application No. PCT/KR2021/007015, filed on Jun. 4, 2021.

(30) Foreign Application Priority Data

Jul. 24, 2020 (IN) .............................. 202041031711
May 14, 2021 (IN) .............................. 202041031711

(51) Int. Cl.
*H04W 72/23* (2023.01)
*H04W 72/1268* (2023.01)
(Continued)

(52) U.S. Cl.
CPC ....... *H04W 72/23* (2023.01); *H04W 72/1268* (2013.01); *H04W 72/21* (2023.01); *H04W 72/569* (2023.01); *H04W 74/0841* (2013.01)

(58) Field of Classification Search
CPC . H04W 72/23; H04W 72/1268; H04W 72/21; H04W 72/569; H04W 74/0841;
(Continued)

(56) References Cited

U.S. PATENT DOCUMENTS 8,582,514 B2 11/2013 Moberg et al.
2010/0080185 A1 4/2010 Guo
(Continued)

FOREIGN PATENT DOCUMENTS

WO  2019095237 A1  5/2019

OTHER PUBLICATIONS

Supplementary European Search Report dated Aug. 25, 2023, in connection with European Patent Application No. 21846526.8, 9 pages.
Intellectual Property India, "Examination report under sections 12 & 13 of the Patents Act," dated Jul. 5, 2022, in connection with Indian Patent Application No. 202041031711, 6 pages.
(Continued)

*Primary Examiner* — Basil Ma

(57) ABSTRACT

Wireless communication network by a network entity. The method includes receiving a first set of data packets and a buffer status report from an electronic device and triggering a timer upon receiving the buffer status report. Further, the method includes performing at least one of: scheduling an uplink grant to the electronic device, if the timer has not expired, stopping the scheduling of the UL grant upon the timer expiring, and prioritizing the scheduling of an uplink grant to the electronic device on determining that the timer is about to expire.

18 Claims, 12 Drawing Sheets

(51) Int. Cl.
*H04W 72/21* (2023.01)
*H04W 72/566* (2023.01)
*H04W 74/0833* (2024.01)

(58) Field of Classification Search
CPC ............... H04W 28/0278; H04W 4/70; H04W 74/0833
See application file for complete search history.

(56) References Cited

U.S. PATENT DOCUMENTS

| | | | |
|---|---|---|---|
| 2011/0164587 | A1* | 7/2011 | Seo ................... H04L 1/1825 370/329 |
| 2016/0323762 | A1 | 11/2016 | Adachi |
| 2017/0127441 | A1* | 5/2017 | Chandrasekhar ............................ H04W 28/0278 |
| 2018/0199315 | A1 | 7/2018 | Hong et al. |
| 2018/0302914 | A1* | 10/2018 | da Silva ............. H04W 76/27 |
| 2019/0141776 | A1 | 5/2019 | Kim et al. |
| 2019/0174490 | A1 | 6/2019 | Dinan |
| 2019/0320353 | A1 | 10/2019 | Kim et al. |
| 2020/0037345 | A1 | 1/2020 | Ryoo et al. |
| 2020/0383089 | A1* | 12/2020 | Goto .................. H04L 1/1822 |
| 2022/0150954 | A1* | 5/2022 | Hussain .............. H04W 72/23 |

OTHER PUBLICATIONS

3GPP TR 45.820 V13.1.0 (Nov. 2015) Technical Report; 3rd Generation Partnership Project; Technical Specification Group GSM/EDGE Radio Access Network; Cellular system support for ultra-low complexity and low throughput Internet of Things (CIoT) (Release 13), 495 pages.

Samsung, "Discussion on scheduling request for NB-Iot", 3GPP TSG RAN WG1 Meeting #92bis, R1-1804333, Sanya, China, Apr. 16-20, 2018, 4 pages.

Ericsson, "Physical layer scheduling request for NB-Iot", 3GPP TSG-RAN WG1 Meeting #92bis, R1-1804156, Sanya, China, Apr. 16-20, 2018, 12 pages.

ETSI MCC, "Report of 3GPP TSG RAN meeting #79, Chennai, India, Mar. 19-22, 2018", 3GPP TSG RAN meeting #80, RP-181300, La Jolla, USA, Jun. 11-14, 2018, 173 pages.

MediaTek Inc., "Physiscal Layer Scheduling Request", 3GPP TSG RAN WG1 Meeting #92bis, R1-1804141, Sanya, China, Apr. 16-20, 2018, 3 pages.

Huawei et al., "Design for physical layer scheduling request", 3GPP TSG RAN WG1 Meeting #93, R1-1805966, Busan, Korea, May 21-25, 2018, 10 pages.

3GPP TR 38.913 V14.3.0 (Jun. 2017); Technical Report; 3rd Generation Partnership Project; Technical Specification Group Radio Access Network; Study on Scenarios and Requirements for Next Generation Access Technologies; (Release 14); Jun. 2017, 39 pages.

* cited by examiner

METHODS AND SYSTEMS FOR MANAGING RADIO RESOURCES IN WIRELESS COMMUNICATION NETWORK

CROSS-REFERENCE TO RELATED APPLICATIONS

This application is a continuation of International Application No. PCT/KR2021/007015, filed Jun. 4, 2021, which claims priority to Indian Provisional Patent Application No. 202041031711, filed Jul. 24, 2020, and Indian Non-Provisional patent application No. 202041031711, filed May 14, 2021, the disclosures of which are herein incorporated by reference in their entirety.

BACKGROUND

1. Field

The present disclosure relates to a wireless communication network, and more particularly related to methods and systems for reducing wastage of radio resources and battery consumption in the wireless communication network.

2. Description of Related Art

In narrowband internet of things (NB-IoT), a design requirement of a narrow bandwidth made it necessary to do away with the statically reserved dedicated radio resources for each electronic device. As a result, there is no counterpart of a physical uplink control channel (PUCCH) (as in a long-term evolution (LTE)) and consequently, a scheduling request (SR) mechanism is performed by a connected mode random access procedure (CRP). There is an inherent drawback with the CRP where a network entity (e.g., eNB, gNB, transmission reception point (TRP), deployed on radio access network (RAN), virtualized radio access network (vRAN), cloud RAN functionality or the like) cannot identify which electronic device initiated the CRP until the network entity decodes a cell-radio network temporary identifier (C-RNTI) medium access control element (MAC CE) in a message 3 (i.e., MSG3).

Further, in release 15 (i.e., Rel-15) of NB-IoT, $3^{rd}$ generation partnership project (3GPP) introduced an optional feature of a physical layer scheduling request (Phy-SR) which provides the electronic device with two alternative mechanisms-piggybacking SR with a hybrid automatic repeat request (HARQ) feedback on a narrowband physical uplink shared channel (NPUSCH), and transmitting the SR over dedicated narrowband physical random access channel (NPRACH) resources. Although, both these mechanisms are free from the aforementioned inherent drawback of CRP, but they suffer from other drawbacks such as any of them cannot be applied to legacy electronic device (as per the Rel-13/14 of the 3GPP), and even in the Rel-15 context, the piggybacking SR along with HARQ Feedback on the NPUSCH can be adopted only in scenarios when an uplink (UL) data generation is closely preceded/coincided with a downlink (DL) transmission, while transmitting SR over dedicated NPRACH resources takes a toll on the UL capacity.

Further, in NB-IoT, another design requirement of an extended coverage called for a provision of extensive repetition of DL and UL channels. NB-IoT defines various coverage levels such as CE0 being a best coverage requiring lesser or no repetition and CE2 being a poorest coverage requiring repetitions that may go as high as 2048 times for narrowband physical downlink shared channel (NPDSCH).

As long as the network entity is performing high repetition DL transmission towards extended coverage electronic device, the network entity cannot schedule UL grant over downlink control information format N0 (DCI N0) in response to a non-zero buffer status report (BSR) received from any other electronic devices.

Further, in NB-IoT, an optional feature of DL transmission gap can allow the network entity to periodically take a break amid high repetition DL transmission and schedule other electronic devices. However, the DL transmission gap causes the radio resource wastage as a radio resource scheduler cannot utilize all available sub-frames in the gap due to constraints imposed by narrowband physical downlink control channel (NPDCCH) search space and fixed set of NPDCCH to NPDSCH scheduling delay requirements. Furthermore, the DL transmission gap also takes an additional toll on the battery life of extended coverage electronic device by stretching the overall duration of their DL transmission.

Further, the inherent design of NB-IoT, where a coverage extension is achieved by excessive repetition of channels coupled with the SR being performed by the CRP procedure, leads to a problem scenario that occurs frequently in the live network and causes significant wastage of radio resources (as depicted in FIG. 1) due to continuous allocation of NPUSCH resources scheduled via NPDCCH in user specific search space (USS) carrying DCI N0 that goes undetected by electronic devices which have initiated CRP. Consider an example, the electronic device initiates the CRP procedure when the network entity delays the scheduling of requested UL grant (received via BSR) for a prolonged duration due to high repetition (up to 2048 times) transmission towards some other electronic device in an extended coverage. On completion of this transmission, the network entity resumes the scheduling of UL grant (via a DCI N0 in USS), in response to the previously queued BSR.

However, this DCI N0 goes undetected by the electronic device (as the electronic device has initiated CRP and temporarily stopped decoding USS), as result, there is no corresponding NPUSCH transmission. This leads to the NPUSCH CRC failure/DTX detection at the network entity, prompting the NPUSCH CRC failure/DTX detection to provide further grants for re-transmissions, which again goes undetected by the electronic device. The cycle of UL grant allocation for retransmission and subsequent CRC failure/DTX detection, continues on-and-on until the electronic device resumes decoding DCI N0 in USS (after the electronic device has transmitted MSG3). This process results in a significant wastage of DL radio resources in the DCI N0 scheduling as well as UL radio resources in the NPUSCH grant allocation. The root cause behind this problem scenario is the fact that network entity resumes serving the BSR, without being aware of the state of the UE with regards of CRP initiation. In fact, it is result of the aforementioned limitation of CRP where the network entity cannot identify which electronic device initiated CRP until the network entity decodes C-RNTI MAC control element in the MSG3.

FIG. 1 illustrates a sequence flow diagram illustrating step by step operations for managing radio resource in a wireless communication network, according to prior art. At S102, the network entity 200 sends NPDSCH with one or more repetitions to a second electronic device 100b. Meanwhile, at S104, a first electronic device 100a sends NPUSCH with non-zero BSR to the network entity 200 and starts a timer 150 (as shown in the FIG. 3). At S106, the timer 150 of the first electronic device 100a expires due to non-receipt of the uplink grant requested earlier via non-zero BSR. As result, the first electronic device 100*a* initiates CRP and therefore sends NPRACH preamble (at the very next NPRACH occasion) to the network entity 200. In other words, the first electronic device 100*a* has sent a positive BSR while network entity 200 DL is occupied with the high repetition transmission towards the second electronic device 100*b*, which is in extended coverage. As result, the scheduling of requested UL grant on the DCI N0 in USS towards the first electronic device 100*a* gets excessively delayed.

Further, the first electronic device 100*a* waits for the requested UL grant until a maximum wait time $T_{UG}$ which is fixed and derived based on higher layer parameters configured by the network entity 200. The failure to receive the requested UL grant within $T_{UG}$ duration prompts the first electronic device 100*a* to initiate CRP and stop decoding NPDCCH in USS until contention resolution is successful. $T_{UG}$ duration is determined as given by:

$$T_{UG} = \text{retxBSR\_Timer} + \text{logicalChannelSR\_ProhibitTime}.$$

At S108, the network entity 200 schedules the RAR through DCI N1 to the first electronic device 100*a* in response to the NPRACH preamble received at S106. At S110, the network entity 200 sends the actual RAR message to the first electronic device 100*a*. At S112*a*, the network entity 200 sends DCI N0 (in USS) in response to the BSR (received at $t_1$) to the first electronic device 100*a*. After transmitting the DCI N0, the network entity 200 except to receive NPUSCH transmission from the first electronic device 100*a* at S114*a*. However, there is no transmission on NPUSCH from the electronic device 100*a* as the electronic device has not decoded the DCI N0 transmitted from the network entity at S112*a*. It leads to CRC failure/DTX detection at the network entity 200. Consequently, at S112*b*, the network entity 200 again sends the DCI N0 to the first electronic device 100*a* for re-transmission on NPUSCH. Subsequent to this, the network entity 200 again excepts the NPUSCH from the electronic device 100*a* at S114*b*. It again leads to CRC failure/DTX detection at the network entity 200. This process of UL grant allocation by the network entity 200 and subsequent CRC failure/DTX detection at the network entity 200 continues on and on until the CRP initiated by the first electronic device 100*a* gets successfully completed as explained in below paragraph.

After receiving the RAR message, at S116, the first electronic device 100*a* sends the MSG3 with CRNTI MAC CE to the network entity 200. Based on the MSG3 containing CRNTI MAC CE, at S118, the network entity 200 sends the DCI0 scrambled with the same RNTI to the first electronic device 100*a*. Reception of DCI N0 scrambled with the aforementioned CRNTI at S118, marks the resolution of contention at the first electronic device 100*a*. At S120, the first electronic device 100*a* sends the NPUSCH message to the network entity 200 and resumes decoding USS of the NPDCCH.

In other words, the network entity 200, after having completed the high repetition DL transmission, schedules MSG2 on DCI N1 in a common search space (CSS) in response to the received NPRACH signal from the first electronic device 100*a*. However, at this stage, the network entity 200 cannot identify that the received NPRACH signal was also from the first electronic device 100*a*, so in parallel, the network entity 200 continues with the uplink grant allocation as well, in response to the queued BSR that was received earlier from the same electronic device, i.e., the first electronic device 100*a*.

As the uplink grant scheduled in response to the BSR is carried over DCI N0 in the USS, the first electronic device 100*a* which has not yet resumed decoding the USS, fails to decode this grant and cannot make the corresponding NPUSCH transmission. This leads to NPUSCH CRC failure/DTX being detected by the network entity 200 prompting the NPUSCH CRC failure/DTX to schedule further grant for re-transmissions and repeated CRC failures/DTX detection. This process continues on and on until the first electronic device 100*a* has successfully completed the ongoing CRP and started decoding back the USS. A typical CRP in the CE0 takes around 300 ms from NPRACH signal transmission to contention resolution. Therefore, during this span, the network entity 200 allocates uplink grant for a large number of retransmissions making a substantial wastage of downlink (i.e., NPDCCH) and uplink (i.e., NPUSCH) radio resources.

SUMMARY

The principal object of the embodiments herein is to disclose methods and systems for reducing wastage of radio resources and battery consumption in a wireless communication network.

Another object of the embodiments herein is to minimize radio resource wastage in the wireless communication network by enabling the network entity to take a CRP initiation state aware scheduling decision in which the network entity refrains from serving BSR to electronic devices that have already initiated CRP and are no longer waiting for the requested UL grant Another object of the embodiments herein is to minimize the radio resource wastage and battery consumption by preventing potential CRPs from happening by adding intelligence in scheduling (not following a conventional scheduling priority order where other purposes like PAGING, RAR, MSG3 retransmission etc. have higher priority than UL grant for positive BSR) and hence prioritizing the UL grant (DCI N0) corresponding to positive BSR, to the electronic device that are expected to initiate CRP soon.

Another object of the embodiments herein is to prevent radio resource wastage and battery consumption by extending a fixed wait time window (when the network entity is either heavily congested in the DL or is busy with high repetition DL transmission towards some poor coverage electronic devices), whereby the electronic device waits for longer (than usual) for the requested UL grant (instead of initiating CRP), when the electronic device predicts the network entity to be in a congestion spurt or high repetition DL transmission state.

Accordingly, the embodiments herein disclose a method for managing radio resource in a wireless communication network. The method includes receiving, by a network entity, a first set of data packets and a buffer status report from an electronic device. Further, the method includes triggering, by the network entity, a timer upon receiving the non-zero buffer status report from the electronic device. Further, the method includes performing, by the network entity, at least one of: scheduling an uplink grant to the electronic device if the timer has not expired, stopping the scheduling of UL grant upon the timer expiry, and prioritizing the scheduling of an uplink grant to the electronic device on determining that the timer is about to expire. A time period, of the timer is about to expire, configured based on an implementation. The implementation can be an electronic device side implementation and a network entity side implementation.

In an embodiment, the UL grant is scheduled using a user equipment (UE) specific search space (USS).

In an embodiment, the method further comprises receiving, by the network entity, the NPRACH signal from the electronic device and sending, by the network entity, the random access response to the electronic device. Further, the method includes receiving, by the network entity, a message comprising a cell-Radio network temporary identifier (C-RNTI) medium access control element (MAC CE). Further, the method includes sending, by the network entity, a downlink control information format N0 (DCI N0) scrambled with C-RNTI to the electronic device. Further, the method includes receiving, by the network entity, a narrowband physical uplink shared channel (NPUSCH) from the electronic device.

In an embodiment, a timer value associated with the timer is determined based on 3GPP defined retransmission buffer status report timer (retxBSR-Timer) and a logical channel scheduling request prohibit timer (logicalChannelSR-ProhibitTimer).

In an embodiment, the method includes receiving a second set of data packets from the electronic device upon at least one of scheduling the uplink grant to the electronic device and prioritizing the scheduling of the uplink grant to the electronic device.

Accordingly, the embodiments herein disclose a method for managing radio resource in a wireless communication network. The method includes sending, by an electronic device, a first set of data packets and a buffer status report to a network entity. Further, the method includes activating, by the electronic device, a timer upon transmission of the buffer status report. Further, the method includes predicting, by the electronic device, a congestion free window for receiving the uplink grant from the network entity, on determining that an uplink grant cannot been received before expiry of the timer. Further, the method includes extending, by the electronic device, the timer value (i.e., waiting period) for receiving the requested uplink grant.

In an embodiment, extending, by the electronic device, the timer value (i.e., waiting period) for receiving the uplink grant includes determining, by the electronic device, that the extension in the timer value (i.e., waiting period) required to reach the congestion free window does not exceed a maximum extension threshold, determining, by the electronic device, that the congestion free window accommodates narrowband physical downlink control channel (NPDCCH) repetitions required in the current coverage level, and extending, by the electronic device, the timer value (i.e., waiting period) for receiving the uplink grant in response to determining that the extension in the timer value (i.e., waiting period) required to reach the congestion free window does not exceed a maximum extension threshold and determining that the congestion free window accommodates the NPDCCH repetitions required in the current coverage level.

In an embodiment, predicting, by the electronic device, the congestion free window for receiving the uplink grant from the network entity includes monitoring, by the electronic device, one or more event(s) that serve as training sets, for the machine learning algorithm running at the electronic device, and predicting, by the electronic device, the congestion free window for receiving the uplink grant from the network entity based on the machine learning model.

In an embodiment, the one or more events may include a buffer status report not addressed by the network entity, a delay in receiving Downlink Control Information comprising an uplink grant (DCI N0) corresponding to the buffer status report, a scheduling delay between the narrowband physical downlink control channel (NPDCCH) and the corresponding narrowband physical downlink shared channel (NPDSCH), and a position of received random access response (RAR) in a response window.

Accordingly, the embodiments herein disclose a network entity for managing radio resource in a wireless communication network. The network entity includes a timer based resource managing controller coupled with a processor and a memory. The timer based resource managing controller is configured to receive a first set of data packets and a buffer status report from an electronic device. Further, the timer based resource managing controller is configured to trigger a timer upon receiving the buffer status report from the electronic device. Further, the timer based resource managing controller is configured to perform at least one of: schedule an uplink grant to the electronic device, if the timer has not expired, stop the scheduling of the UL grant upon the timer expiring, and prioritize the scheduling of an uplink grant to the electronic device on determining that the timer is about to expire.

Accordingly, the embodiments herein disclose an electronic device for managing radio resource in a wireless communication network. The electronic device includes a timer based resource managing controller coupled with a processor and a memory. The timer based resource managing controller is configured to send a first set of data packets and a buffer status report to a network entity. Further, the timer based resource managing controller is configured to activate a timer upon transmission of the buffer status report and predict a congestion free window for receiving the uplink grant from the network entity on determining that an uplink grant cannot been received before expiry of the timer. Further, the timer based resource managing controller is configured to extend a timer value (i.e., waiting period) for receiving the requested uplink grant.

These and other aspects of the embodiments herein will be better appreciated and understood when considered in conjunction with the following description and the accompanying drawings. It should be understood, however, that the following descriptions, while indicating at least one embodiment and numerous specific details thereof, are given by way of illustration and not of limitation. Many changes and modifications may be made within the scope of the embodiments herein without departing from the scope thereof, and the embodiments herein include all such modifications.

[Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for certain words and phrases are provided throughout this patent document, those of ordinary skill in the art should understand that in many, if not most instances, such definitions apply to prior, as well as future uses of such defined words and phrases.

BRIEF DESCRIPTION OF DRAWINGS

The embodiments disclosed herein are illustrated in the accompanying drawings, throughout which like reference letters indicate corresponding parts in the various figures. The embodiments herein will be better understood from the following description with reference to the drawings, in which.

DETAILED DESCRIPTION

Figure 1:
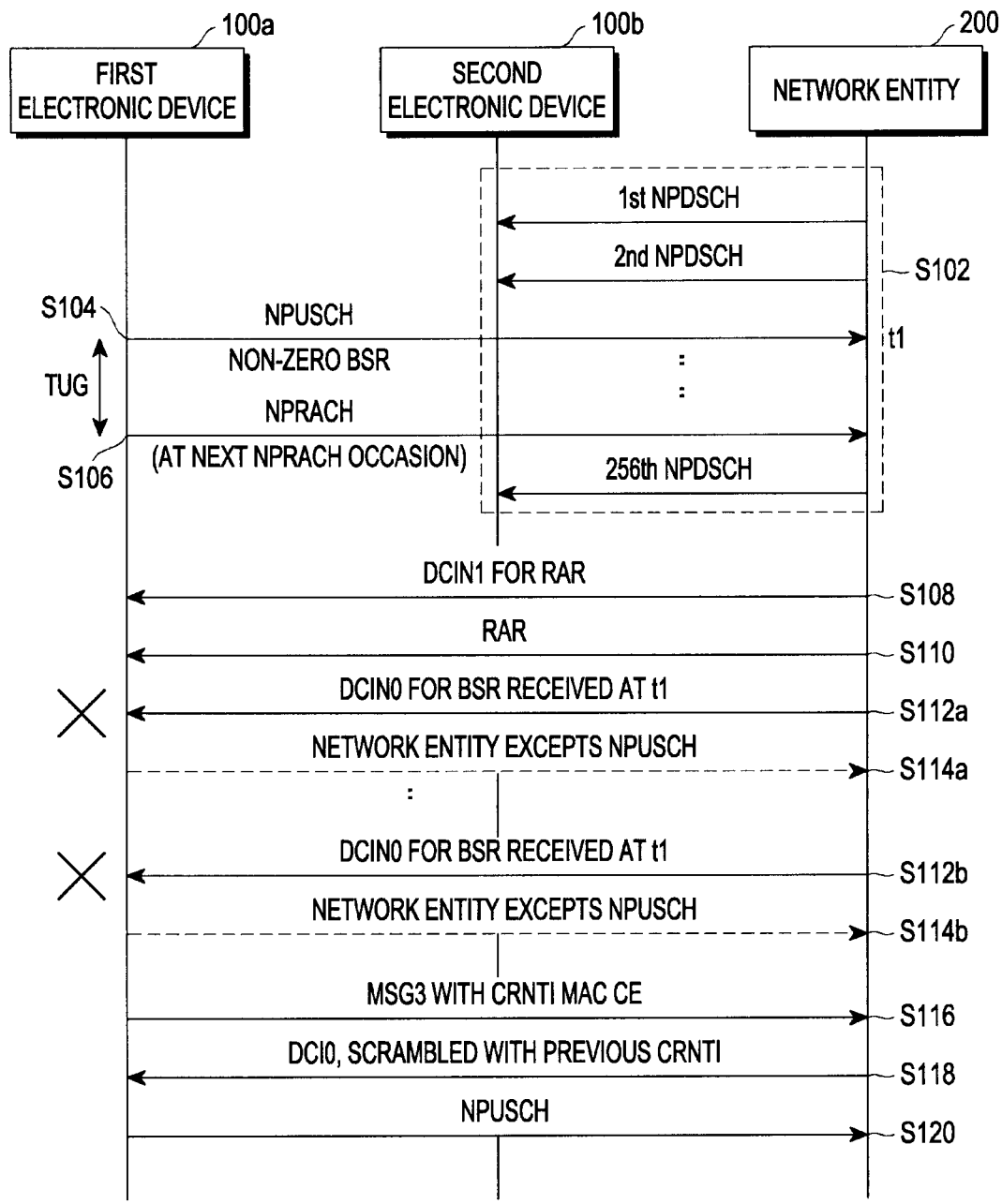
FIG. 1 is a sequence flow diagram illustrating step by step operations for managing a radio resource in a wireless communication network.

FIGS. 1 through 13, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. The examples used herein are intended merely to facilitate an understanding of ways in which the embodiments herein can be practiced and to further enable those of skill in the art to practice the embodiments herein. Accordingly, the examples should not be construed as limiting the scope of the embodiments herein.

The terms "electronic device" and "UE" are used interchangeably in the patent disclosure. The terms "network entity" and "eNB" are used interchangeably in the patent disclosure.

The embodiments herein achieve a method for managing radio resource in a wireless communication network. The method includes receiving, by a network entity, a first set of data packets and a buffer status report from an electronic device. Further, the method includes triggering, by the network entity, a timer upon receiving the buffer status report from the electronic device. Further, the method includes performing, by the network entity, at least one of: scheduling an uplink grant to the electronic device, if the timer has not expired, stopping the scheduling of UL grant upon the timer expiring, and prioritizing the scheduling of an uplink grant to the electronic device on determining that the timer is about to expire.

Unlike conventional methods and systems, the provided method can be used to minimize the resource wastage in the wireless communication network by enabling the network entity to take a CRP initiation state aware scheduling decision in which, the network entity refrains from serving BSR to electronic devices that have already initiated CRP and are no longer waiting for the requested UL grant.

Further, the provided method can be used to minimize the radio resource wastage and battery consumption by preventing potential CRPs from happening by adding intelligence in scheduling (not following a conventional scheduling priority order where other purposes like PAGING, RAR, MSG3 retransmission etc. have higher priority than UL grant for positive BSR) and hence prioritizing the UL grant (DCI N0) corresponding to positive BSR, to the electronic device that are expected to initiate CRP soon.

Further, the provided method can be used to minimize the consumption of radio resource and battery power through eNB congestion/high repetition DL spurt aware CRP initiation at the electronic device whereby the electronic device predicts the network entity congestion/high repetition DL spurt through appropriate machine learning (ML) approach and leverages this information to extend the requested UL grant waiting window beyond congestion/high repetition DL spurt, i.e., it waits for longer (than usual) for the requested UL grant instead of initiating CRP, allowing the network entity an additional margin to serve the BSR in case of congestion/high repetition DL spurt.

The provided method can be used to save the NPRACH/4MSG2/MSG3 radio resources by preventing the potential CRPs. Apart from radio resource saving, the method can be used to minimize the number of CRPs also results in saving the battery of the electronic device.

Referring now to the drawings, and more particularly to FIGS. 2 through 12, where similar reference characters denote corresponding features consistently throughout the figures, there are shown at least one embodiment.

Figure 2:
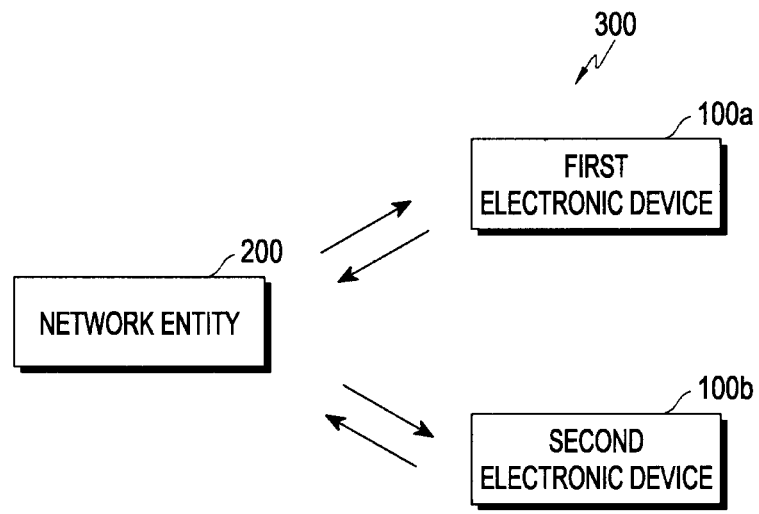
FIG. 2 illustrates a wireless communication network for managing the radio resource according to embodiments as disclosed herein.

FIG. 2 illustrates a wireless communication network 300 for managing a radio resource, according to an embodiment as disclosed herein. In an embodiment, the wireless communication network 300 includes one or more electronic device including a first electronic device 100a and a second electronic device 100b and a network entity 200. The one or more electronic device 100a and 100b can be, for example, but not limited to a cellular phone, a smart phone, a smart watch, a smart fridge, a smart TV, a smart washing machine, a smart dishwasher, a closed-circuit television (CCTV), a personal digital assistant (PDA), a tablet computer, a laptop computer, a virtual reality device, an immersive system, an internet of things (IoT), a smart sensor, a drone and a vehicle. The network entity 200 may also include or be referred to by those skilled in the art as a base station, a base transceiver station, a radio base station, an access point, a radio transceiver, an eNB, a gNodeB (GNB), a 5G eNB, a transmission reception point (TRP), deployed on a radio access network (RAN), virtualized radio access network (vRAN), cloud RAN functionality or the like. The wireless communication network 300 can be, for example, but not limited to a NB-IoT network, a fifth generation (5G) network, an edge computing network, a sixth generation (6G) network or the like. The radio resource can be, for example, but not limited to a NPRACH radio resource, a MSG2 radio resource, a MSG3 radio resource, a MSG4 radio resource, a bandwidth, a battery of the electronic device 100a or 100b or the like.

In an embodiment, the network entity 200 is configured to receive a first set of data packets and a buffer status report from the first electronic device 100a. The first set of data packets can be NPUSCH. After receiving the buffer status report from the first electronic device 100a, the network entity 200 is configured to trigger a timer 250 (as shown in the FIG. 4) upon receiving the buffer status report from the first electronic device 100. The timer can be a bsrServingTimer. A timer value associated with the timer 250 is determined based on retransmission buffer status report timer (retxBSR-Timer) (not shown) and a logical channel scheduling request (SR) prohibit timer (logicalChannelSR-ProhibitTimer) (not shown). The timer value is set based on the value of 3GPP defined timers (i.e., retransmission buffer status report timer and logical channel scheduling request (SR) prohibit timer).

In an embodiment, the network entity 200 is configured to provide an uplink grant to the first electronic device 100a if the timer 250 has not expired. The network entity 200 is configured to receive a second set of data packets from the first electronic device 100a upon providing the uplink grant to the first electronic device 100a. In another embodiment, the network entity 200 is configured to send a downlink control information for a random access response to the first electronic device 100a. In another embodiment, the network entity 200 is configured to stop the scheduling of UL grant upon the timer 250 expiring. In another embodiment, the network entity 200 is configured to prioritize the scheduling of the uplink grant to the first electronic device 100a on determining that the timer 250 is about to expire. A time period, of the timer is about to expire, configured based on an implementation. The implementation can be electronic device side implementation and a network entity side implementation. The network entity 200 is configured to receive the second set of data packets from the first electronic device 100a upon prioritizing the scheduling of the uplink grant to the first electronic device 100a. In an embodiment, the UL grant is scheduled using a specific search space (e.g., USS or the like).

Further, the network entity 200 is configured to receive the NPRACH signal from the first electronic device 100a and send the random access response to the first electronic device 100a. Further, the network entity 200 is configured to receive a message comprising a C-RNTI MAC CE. Further, the network entity 200 is configured to send a DCI N0 scrambled with the C-RNTI to the first electronic device 100a. Further, the network entity 200 is configured to receive a NPUSCH from the first electronic device 100a.

In an embodiment, the first electronic device 100a is configured to send the first set of data packets and the buffer status report to the network entity 200. After sending the buffer status report to the network entity 200, the electronic device 100 is configured to activate the timer 150 and predict a congestion free window for receiving the uplink grant from the network entity 200 on determining that an uplink grant cannot been received before expiry of the timer 150. In an embodiment, the congestion free window for receiving the uplink grant is predicted by monitoring one or more event that serve as training sets for a machine learning model running in the electronic device 100, and predicting the congestion free window for receiving the uplink grant from the network entity 200 based on the machine learning model. The one or more events can be, for example, but not limited to a buffer status report not addressed by the network entity 200, a delay in receiving downlink control information comprising an uplink grant (DCI-N0) corresponding to the buffer status report, a scheduling delay between the narrowband physical downlink control channel (NPDCCH) and the corresponding narrowband physical downlink shared channel (NPDSCH), and a position of received random access response (RAR) in a response window.

Further, the first electronic device 100a is configured to extend a timer value (i.e., waiting period) for receiving the requested uplink grant. In an embodiment, the timer value (i.e., waiting period) for receiving the requested uplink grant is extended by determining that extension in the timer value required to reach the congestion free window does not exceed a maximum extension threshold and determining that the congestion free window accommodates NPDCCH repetitions required in the current coverage level.

Figure 3:
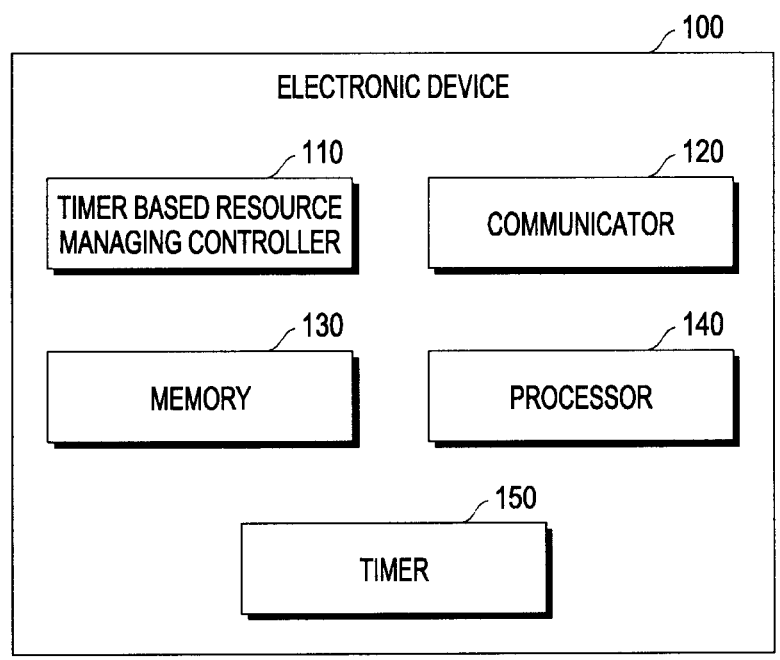
FIG. 3 illustrates various hardware components of an electronic device for managing the radio resource in the wireless communication network according to embodiments as disclosed herein.

FIG. 3 illustrates various hardware components of the electronic device 100 for managing the radio resource in the wireless communication network 300 according to an embodiment as disclosed herein. In an embodiment, the electronic device 100 includes a timer based resource managing controller 110, a communicator 120, a memory 130, at least one processor 140 and a timer 150. The processor 140 is operated with the timer based resource managing controller 110, the communicator 120, the memory 130, and the timer 150.

The timer based resource managing controller 110 is configured to send the first set of data packets and the buffer status report to the network entity 200. After sending the buffer status report to the network entity 200, the timer based resource managing controller 110 is configured to activate the timer 150 and predict the congestion free window for receiving the uplink grant from the network entity 200 on determining that the uplink grant cannot been received before expiry of the timer 150.

In an embodiment, the timer based resource managing controller 110 is configured to monitor the one or more event that serve as training set for the machine learning model or the AI model running in the electronic device 100. Further, the timer based resource managing controller 110 is configured to predict the congestion free window for receiving the uplink grant from the network entity 200 based on the machine learning (ML) model/artificial intelligence (AI) model.

The timer based resource managing controller 110 is configured to extend the timer value (i.e., waiting period) for receiving the requested uplink grant. In an embodiment, the timer based resource managing controller 110 is configured to extend the timer value (i.e., waiting period) for receiving the uplink grant by determining that extension in the timer value required to reach the congestion free window does not exceed the maximum extension threshold and determining that the congestion free window accommodates the NPDCCH repetitions required in the current coverage level.

Further, the processor 140 is configured to execute instructions stored in the memory 130 and to perform various processes. The communicator 120 is configured for communicating internally between internal hardware components and with external devices via one or more networks. The memory 130 also stores instructions to be executed by the processor 110 (e.g., timer based resource managing controller). The memory 130 may include non-volatile storage elements. Examples of such non-volatile storage elements may include magnetic hard discs, optical discs, floppy discs, flash memories, or forms of electrically programmable memories (EPROM) or electrically erasable and programmable (EEPROM) memories. In addition, the memory (130) may, in some examples, be considered a non-transitory storage medium. The term "non-transitory" may indicate that the storage medium is not embodied in a carrier wave or a propagated signal. However, the term "non-transitory" should not be interpreted that the memory 130 is non-movable. In certain examples, a non-transitory storage medium may store data that can, over time, change (e.g., in random access memory (RAM) or cache).

At least one of the plurality of modules may be implemented through the AI model. A function associated with AI may be performed through the non-volatile memory, the volatile memory, and the processor 140. The processor 140 may include one or a plurality of processors. At this time, one or a plurality of processors may be a general purpose processor, such as a central processing unit (CPU), an application processor (AP), or the like, a graphics-only processing unit such as a graphics processing unit (GPU), a visual processing unit (VPU), and/or an AI-dedicated processor such as a neural processing unit (NPU).

The one or a plurality of processors control the processing of the input data in accordance with a predefined operating rule or artificial intelligence (AI) model stored in the non-volatile memory and the volatile memory. The predefined operating rule or artificial intelligence model is provided through training or learning.

Here, being provided through learning means that a predefined operating rule or AI model of a desired characteristic is made by applying a learning algorithm to a plurality of learning data. The learning may be performed in a device itself in which AI according to an embodiment is performed, and/o may be implemented through a separate server/system.

The AI model may comprise of a plurality of neural network layers. Each layer has a plurality of weight values, and performs a layer operation through calculation of a previous layer and an operation of a plurality of weights. Examples of neural networks include, but are not limited to, convolutional neural network (CNN), deep neural network (DNN), recurrent neural network (RNN), restricted Boltzmann Machine (RBM), deep belief network (DBN), bidirectional recurrent deep neural network (BRDNN), generative adversarial networks (GAN), and deep Q-networks.

The learning algorithm is a method for training a predetermined target device (for example, a robot) using a plurality of learning data to cause, allow, or control the target device to make a determination or prediction. Examples of learning algorithms include, but are not limited to, supervised learning, unsupervised learning, semi-supervised learning, or reinforcement learning.

Although the FIG. 3 illustrates various hardware components of the electronic device 100 but it is to be understood that other embodiments are not limited thereon. In other embodiments, the electronic device 100 may include less or more number of components. Further, the labels or names of the components are used only for illustrative purpose and does not limit the scope of the disclosure. One or more components can be combined together to perform same or substantially similar function in the electronic device 100.

Figure 4:
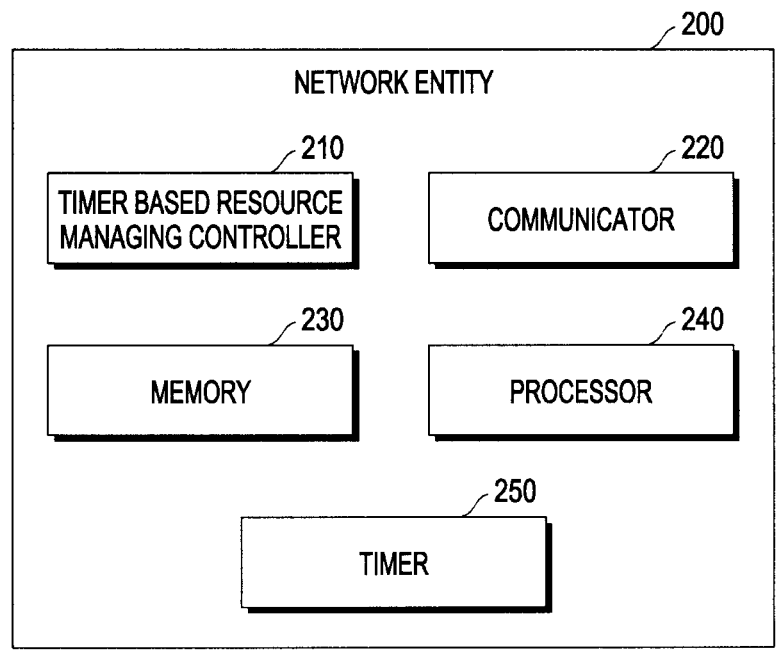
FIG. 4 illustrates various hardware components of a network entity for managing the radio resource in the wireless communication network according to embodiments as disclosed herein.

FIG. 4 illustrates various hardware components of the network entity 200 for managing the radio resource in the wireless communication network 300, according to an embodiment as disclosed herein. In an embodiment, the network entity 200 includes a timer based resource managing controller 210, a communicator 220, a memory 230, at least one processor 240 and a timer 250. The processor 240 is operated with the timer based resource managing controller 210, the communicator 220, the memory 230, and the timer 250.

The timer based resource managing controller 210 is configured to receive the first set of data packets and the buffer status report from the electronic device 100. Upon receiving the on the buffer status report from the electronic device 100, the timer based resource managing controller 210 is configured to trigger the timer 250. In an embodiment, if the timer 250 has not expired, the timer based resource managing controller 210 is configured to scheduling the uplink grant to the electronic device 100 and receive the second set of data packets from the electronic device 100 upon scheduling the uplink grant to the electronic device

100. In another embodiment, the timer based resource managing controller 210 is configured to stop the scheduling of UL grant upon the timer 250 expiring.

In another embodiment, the timer based resource managing controller 210 is configured to prioritize the scheduling of the uplink grant to the electronic device 100 upon determining that the timer 250 is about to expire and receive the second set of data packets from the electronic device 100 upon scheduling of the uplink grant to the electronic device 100. The time period, of the timer is about to expire, configured based on an implementation. The implementation can be the electronic device side implementation and the network entity side implementation.

Further, the timer based resource managing controller 210 is configured to receive the NPRACH signal from the electronic device 100 and send the random access response to the electronic device 100. Further, the timer based resource managing controller 210 is configured to receive the message comprising the C-RNTI MAC CE. Further, the timer based resource managing controller 210 is configured to send the DCI No scrambled with the C-RNTI to the electronic device 100. Further, the timer based resource managing controller 210 is configured to receive the NPUSCH from the electronic device 100.

Further, the processor 240 is configured to execute instructions stored in the memory 230 and to perform various processes. The communicator 220 is configured for communicating internally between internal hardware components and with external devices via one or more networks. The memory 230 also stores instructions to be executed by the processor 210 (e.g., a timer based resource managing controller). The memory 230 may include non-volatile storage elements. Examples of such non-volatile storage elements may include magnetic hard discs, optical discs, floppy discs, flash memories, or forms of electrically programmable memories (EPROM) or electrically erasable and programmable (EEPROM) memories. In addition, the memory 230 may, in some examples, be considered a non-transitory storage medium. The term "non-transitory" may indicate that the storage medium is not embodied in a carrier wave or a propagated signal. However, the term "non-transitory" should not be interpreted that the memory 230 is non-movable. In certain examples, a non-transitory storage medium may store data that can, over time, change (e.g., in random access memory (RAM) or cache).

At least one of the plurality of modules may be implemented through an AI model. A function associated with AI may be performed through the non-volatile memory, the volatile memory, and the processor 240. The processor 240 may include one or a plurality of processors. At this time, one or a plurality of processors may be a general purpose processor, such as a central processing unit (CPU), an application processor (AP), or the like, a graphics-only processing unit such as a graphics processing unit (GPU), a visual processing unit (VPU), and/or an AI-dedicated processor such as a neural processing unit (NPU).

The one or a plurality of processors control the processing of the input data in accordance with a predefined operating rule or artificial intelligence (AI) model stored in the non-volatile memory and the volatile memory. The predefined operating rule or artificial intelligence model is provided through training or learning.

Here, being provided through learning means that, by applying a learning algorithm to a plurality of learning data, a predefined operating rule or AI model of a desired characteristic is made. The learning may be performed in a device itself in which AI according to an embodiment is performed, and/o may be implemented through a separate server/system.

The AI model may comprise of a plurality of neural network layers. Each layer has a plurality of weight values, and performs a layer operation through calculation of a previous layer and an operation of a plurality of weights. Examples of neural networks include, but are not limited to, convolutional neural network (CNN), deep neural network (DNN), recurrent neural network (RNN), restricted Boltzmann Machine (RBM), deep belief network (DBN), bidirectional recurrent deep neural network (BRDNN), generative adversarial networks (GAN), and deep Q-networks.

The learning algorithm is a method for training a predetermined target device (for example, a robot) using a plurality of learning data to cause, allow, or control the target device to make a determination or prediction. Examples of learning algorithms include, but are not limited to, supervised learning, unsupervised learning, semi-supervised learning, or reinforcement learning.

Although the FIG. 4 illustrates various hardware components of the network entity 200 but it is to be understood that other embodiments are not limited thereon. In other embodiments, the network entity 200 may include less or more number of components. Further, the labels or names of the components are used only for illustrative purpose and does not limit the scope of the disclosure. One or more components can be combined together to perform same or substantially similar function in the network entity 200.

Figure 5:
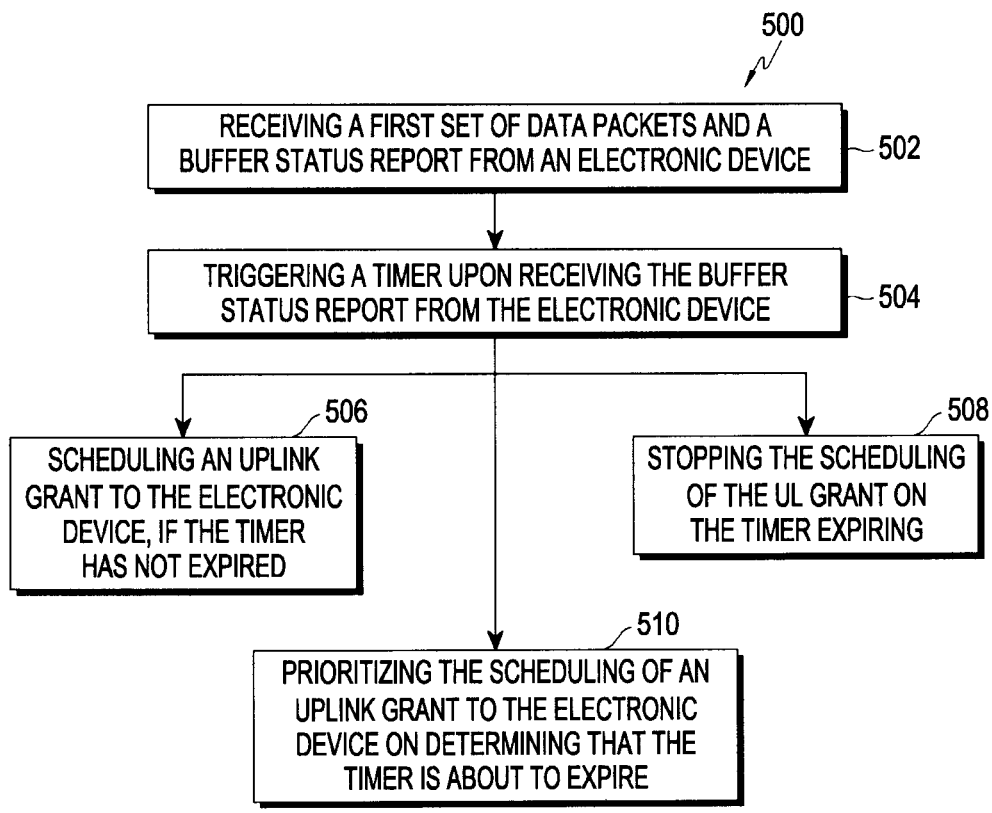
FIG. 5 is a flow diagram illustrating a method for managing the radio resource in the wireless communication network according to embodiments as disclosed herein.

FIG. 5 is a flow diagram 500 illustrating a method for managing the radio resource in the wireless communication network 300 according to an embodiment as disclosed herein. The operations 502-510 are performed by the the timer based resource managing controller 210. At 502, the method includes receiving the first set of data packets and the buffer status report from the electronic device 100. At 504, the method includes triggering the timer 250 upon receiving the buffer status report from the electronic device 100. At 506, the method includes scheduling the uplink grant to the electronic device 100 if the timer 250 has not expired. At 508, the method includes stopping the scheduling of UL grant on the timer 250 expiring. At 510, the method includes prioritizing the scheduling of the uplink grant to the electronic device 100 on determining that the timer 250 is about to expire.

Figure 6:
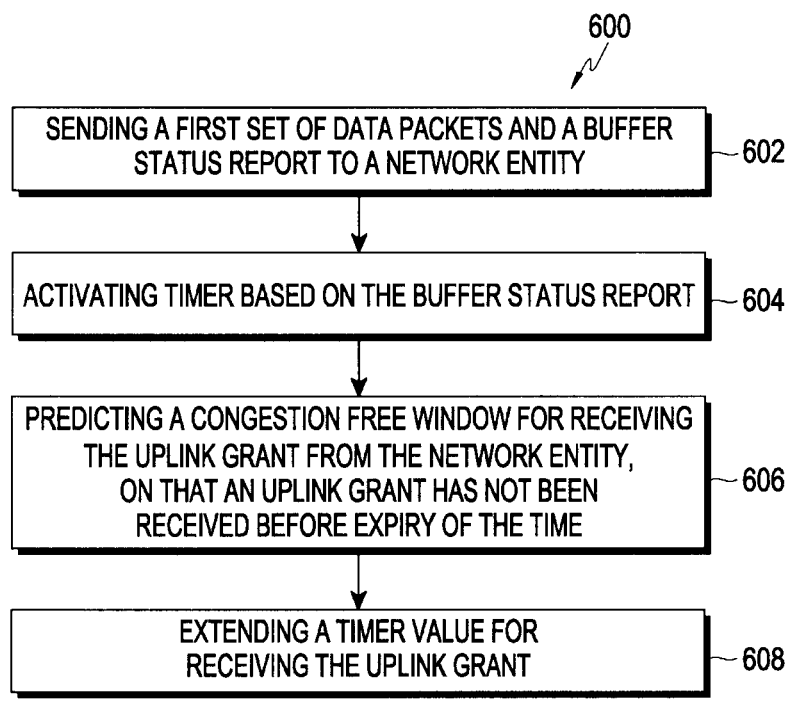
FIG. 6 is a flow diagram illustrating a method for managing the radio resource in the wireless communication network according to embodiments as disclosed herein.

FIG. 6 is a flow diagram 600 illustrating a method for managing the radio resource in the wireless communication network 300 according to an embodiment as disclosed herein. The operations 602-608 are performed by the the timer based resource managing controller 110.

At 602, the method includes sending the first set of data packets and the buffer status report to the network entity 200. At 604, the method includes activating the timer 150 based on the buffer status report. At 606, the method includes predicting the congestion free window for receiving the uplink grant from the network entity 200 on determining that the uplink grant has not been received before expiry of the timer 150. At 608, the method includes extending the timer value (i.e., waiting period) for receiving the requested uplink grant.

Figure 7:
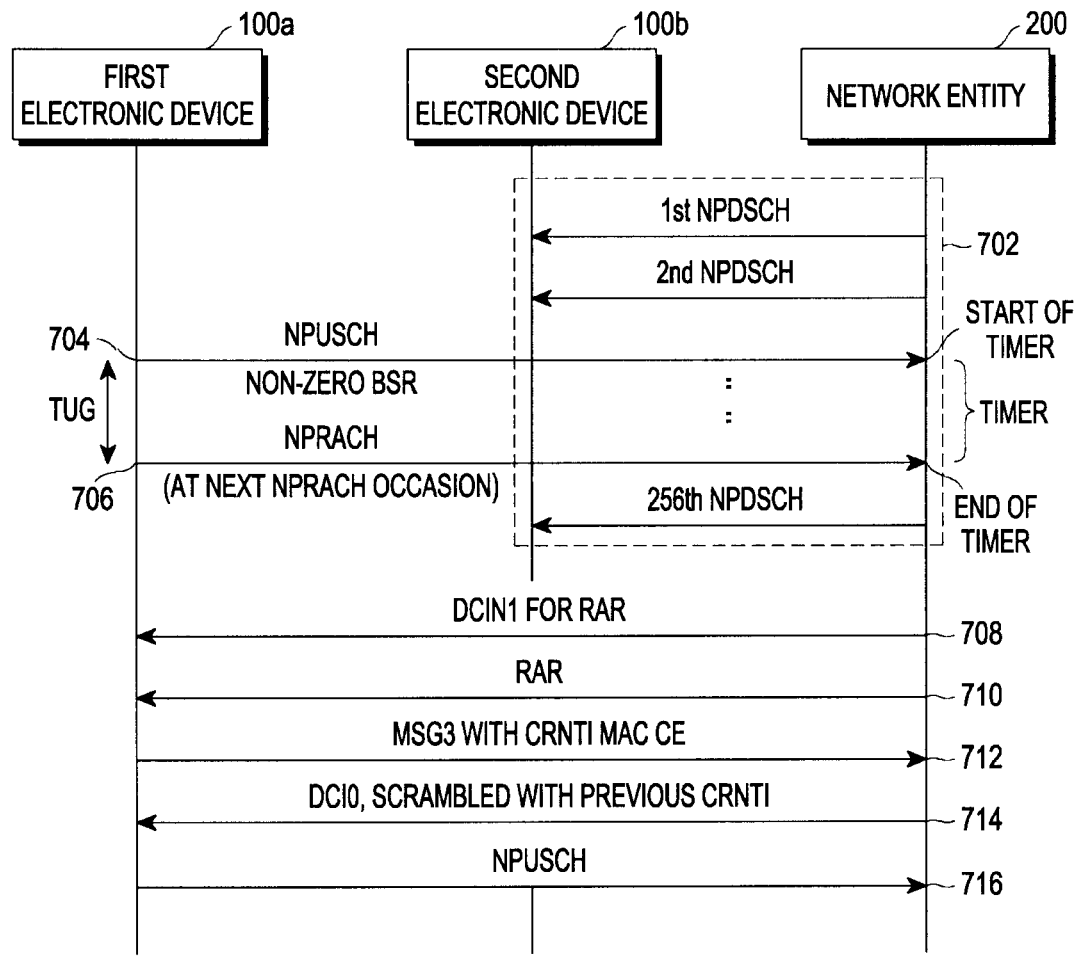
FIG. 7 is a sequence flow diagram illustrating step by step operations, implemented by the network entity, for managing the radio resource in the wireless communication network when a timer is expired, according to embodiments as disclosed herein.

FIG. 7 is a sequence flow diagram illustrating step by step operations, implemented by the network entity 200, for managing the radio resource in the wireless communication network 300, when the timer 250 is expired, according to an embodiment as disclosed herein.

At 702, the network entity 200 sends the NPDSCH with one or more repetitions to the second electronic device 100b.

Meanwhile, at 704, the first electronic device 100*a* sends the NPUSCH with the non-zero BSR report to the network entity 200 and starts the timer 150. After receiving the non-zero BSR report from the first electronic device 100*a*, the network entity 200 starts the timer 250. At 706, the timer 150 of the first electronic device 100*a* expires due to the non-receipt of the uplink grant requested via the non-zero BSR. As result, the first electronic device 100*a* initiates the CRP and therefore sends NPRACH preamble (at the very next NPRACH occasion) to the network entity 200.

Based on the provided method, at 708, the network entity 200 schedules the RAR through the DCIN1 to the first electronic device 100*a*. At 710, the network entity 200 sends the actual RAR message to the first electronic device 100*a*. Based on the actual RAR message, at 712, the first electronic device 100*a* sends the MSG3 comprising the CRNTI MAC CE to the network entity 200. Based on the MSG3 comprising the CRNTI MAC CE, at 714, the network entity 200 sends the DCI0 scrambled with previous CRNTI to the first electronic device 100*a*. At 716, the first electronic device 100*a* sends the NPUSCH message to the network entity 200.

In the provided method, there is no DCI N0 allocation to the first electronic device 100*a* in the USS to serve the received BSR. Hence, the network entity 200 avoids the resource wastage in the wireless communication network 300.

In the conventional methods, the resource wastage has occurred because the network entity 200 continues with the UL scheduling oblivious of the state of the first electronic device 100*a* with regards to the CRP initiation. Based on the provided method, the method can be used to prevent the resource wastage by enabling the network entity 200 to take CRP initiation state aware scheduling decision, whereby the network entity 200 refrains from the serving BSR to the first electronic device 100*a* that have already initiated CRP and are no longer waiting for the requested UL grant. Further, the network entity 200 starts the timer 250 on receiving the non-zero BSR from the first electronic device 100*a* and serve the BSR (with DCI N0) only if the timer 250 is running.

Figure 8:
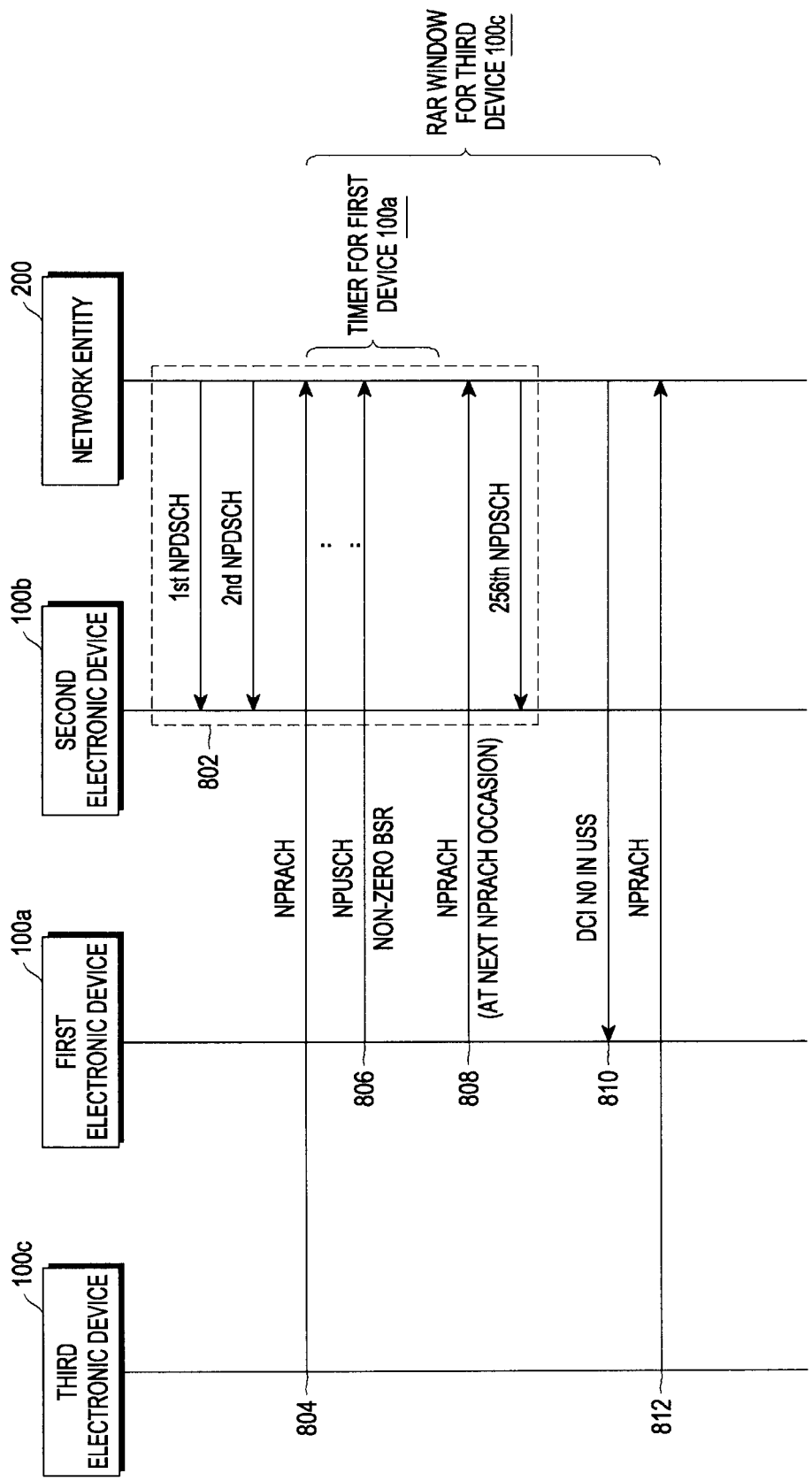
FIG. 8 is a sequence flow diagram illustrating step by step operations, implemented by the network entity, for managing the radio resource in the wireless communication network when the timer is not expired, according to embodiments as disclosed herein.

FIG. 8 is a sequence flow diagram illustrating step by step operations, implemented by the network entity 200, for managing the radio resource in the wireless communication network 300 when the timer 250 is not expired, according to an embodiment as disclosed herein.

At 802, the network entity 200 sends the NPDSCH with one or more repetitions to the second electronic device 100*b*. Meanwhile, at 804, a third electronic device 100*c* sends the NPRACH to the network entity 200. At 806, the first electronic device 100*a* sends the NPUSCH and the non-zero BSR report to the network entity 200. After receiving the non-zero BSR report from the first electronic device 100*a*, the network entity 200 starts the timer 250. At 808, the first electronic device 100*a* sends the NPRACH (at next NPRACH occasion) to the network entity 200, meanwhile the timer 250 of the network entity 200 is about to expire.

Based on the provided method, the network entity 200 sends the DCI N0 in the USS to the first electronic device 100*a*. The network entity 200 may prioritize (over all other downlink transmissions; e.g., NPDCCH/NPDSCH related to paging, RAR, MSG3 Retransmission, MSG4, RLC STATUS, etc.), the scheduling of requested UL grant (i.e., DCI N0 in USS) to the first electronic device 100*a*, whose timer 150 is expiring soon. This may minimize the number of potential CRP itself and save further resources along with the battery power consumption of the first electronic device 100*a*. Further, at 812, the third electronic device 100*c* sends the NPRACH to the network entity 200.

Figure 13:
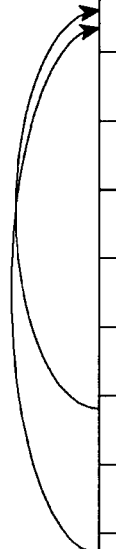
FIG. 13 illustrates an example priority order of different downlink transmissions followed by conventional schedulers according to embodiments as disclosed herein.

In an example, the priority order of different downlink transmissions followed by conventional schedulers is mentioned in FIG. 13.

However, in the provided implementation, the network entity 200 may escalate the priority (even higher than that of RAR) of scheduling the requested UL grant (NPDCCH carrying DCI N0 for initial NPUSCH transmission or re-transmission), towards those the electronic device 100*a* for which the bsrServingTimer is expiring soon.

In the FIG. 8, even though RAR window of the first electronic device 100*a* is about to expire, the network entity 200 may still prioritize the scheduling of requested uplink grant (NPDCCH carrying DCI N0) to the first electronic device 100*a* to prevent the bsrServingTimer from expiring and subsequent CRP initiation. With such implementation, although the third electronic device 100*c* would have to transmit NPRACH again, but significant radio resources could be saved in avoiding MSG2/MSG3/MSG4 transmissions for first electronic device 100*a*.

Figure 9:
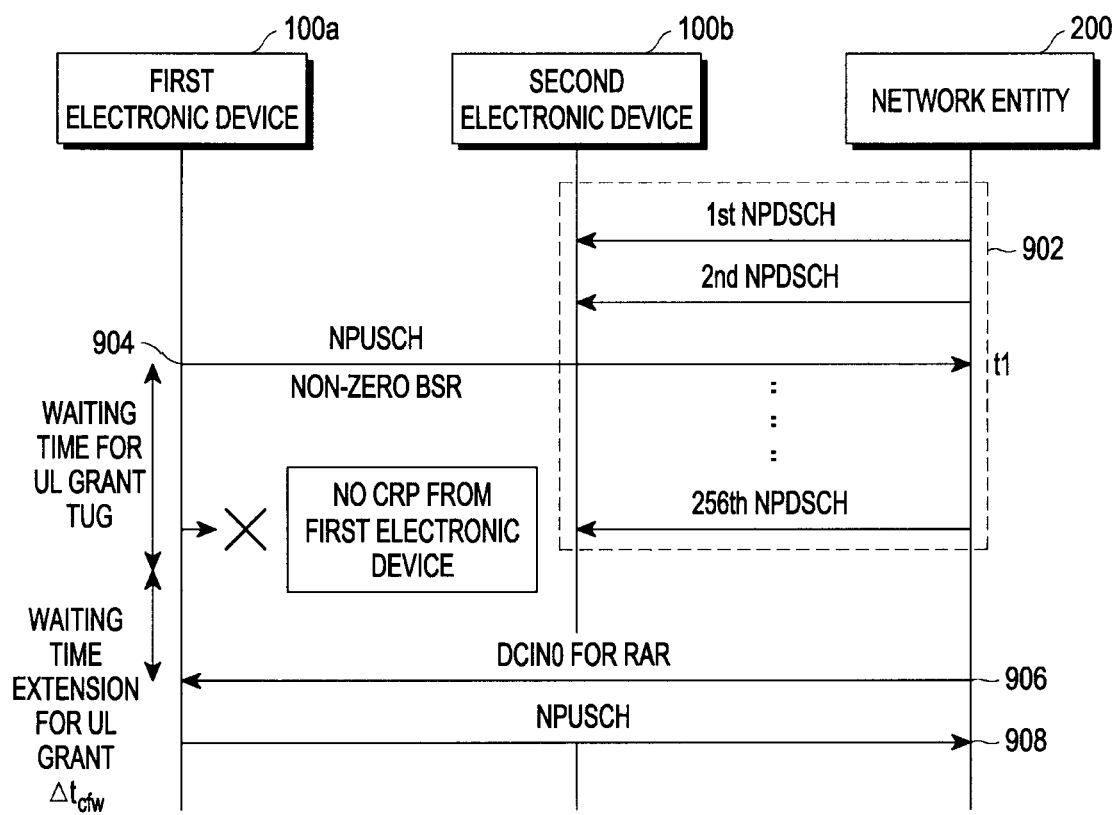
FIG. 9 is a sequence flow diagram illustrating step by step operations, implemented by the electronic device, for managing the radio resource in the wireless communication network, according to embodiments as disclosed herein.

FIG. 9 is a sequence flow diagram illustrating step by step operations, implemented by the electronic device 100, for managing the radio resource in the wireless communication network 300, according to an embodiment as disclosed herein.

Referring to FIG. 9, at 902, the network entity 200 sends the NPDSCH with the one or more repetitions to the second electronic device 100*b*. Meanwhile, at 904, the first electronic device 100*a* sends the NPUSCH and the non-zero BSR report to the network entity 200. After sending the non-zero BSR report to the network entity 200, the first electronic device 100*a* starts the timer 150. At 906, the first electronic device 100*a* predicts the congestion free window for receiving the uplink grant from the network entity 200 on determining that the uplink grant has not been received before expiry of the timer 150. Further, the first electronic device 100*a* extends the waiting period of the timer 150 for receiving the uplink grant (i.e., DCIN0 for RAR). At 908, the first electronic device 100*a* sends the NPUSCH to the network entity 200.

Consider an example, as per traffic model in TR 45.820, two types of traffics are considered to encompass all the machine type communication (MTC) use cases-mobile autonomous reporting (MAR) and network command (NC) triggered reporting. Split of inter-arrival time periodicity for both the kind of traffics is almost fixed: 1 day (40%), 2 hours (40%), 1 hour (15%), and 30 minutes (5%). Furthermore, the NB-IoT is inherently defined for static use-cases and lacks mobility support. Therefore, the network entity congestion/high repetition DL spurt would follow more of a periodically repeating pattern which could be predicted by the electronic device 100 based on learning from past scheduling experience.

The electronic device 100 may keep track (with respect to time), of following parameters/values encountered during normal data scheduling, which may give the indication of the network entity congestion/high repetition DL spurt at a specific time:

(1) BSR not addressed by eNB, eventually leading to the trigger of scheduling request (CRP),
(2) Delay in receiving DCI N0 corresponding to BSR,
(3) NPDSCH scheduling delay ($k_0$), and
(4) Position of received RAR in response window.

With the help of suitable lightweight Machine Learning approach (e.g., Logistic Regression), the electronic device 100 can predict the network entity congestion/high repetition DL spurt, using the inputs collected over a suitable period of time.

Further, on not receiving the requested UL grant (DCI N0) until the expiry of 3GPP defined timer during predicted network entity congestion spurt, instead of initiating CRP, the electronic device 100 may extend the wait time for the requested UL grant, so as to allow the network entity 200 an opportunity to schedule the same in the upcoming congestion free window. The electronic device 100 may extend the waiting time for the requested UL grant only if the electronic device predicts a congestion free window satisfying all of the below criteria:

(1) C1: The additional wait required to reach this congestion free window does not exceed the maximum extension threshold; and
(2) C2: The congestion free window is wide enough to accommodate all the NPDCCH repetitions required in the current coverage level.

Following parameters are determined:
(1) $\Delta t_{cfw}$: additional wait (beyond $T_{UG}$) required to reach a congestion free window;
(2) $\Delta d_{cfw}$: duration of this congestion free window;
(3) $\Delta T_{cfw}^{MAX}$: maximum allowed extension in wait time (derived through simulation result); and
(4) $D_{NPDCCH}^{MIN}$: minimum duration required to schedule NPDCCH given the repetition requirement of current coverage level.

Figure 12:
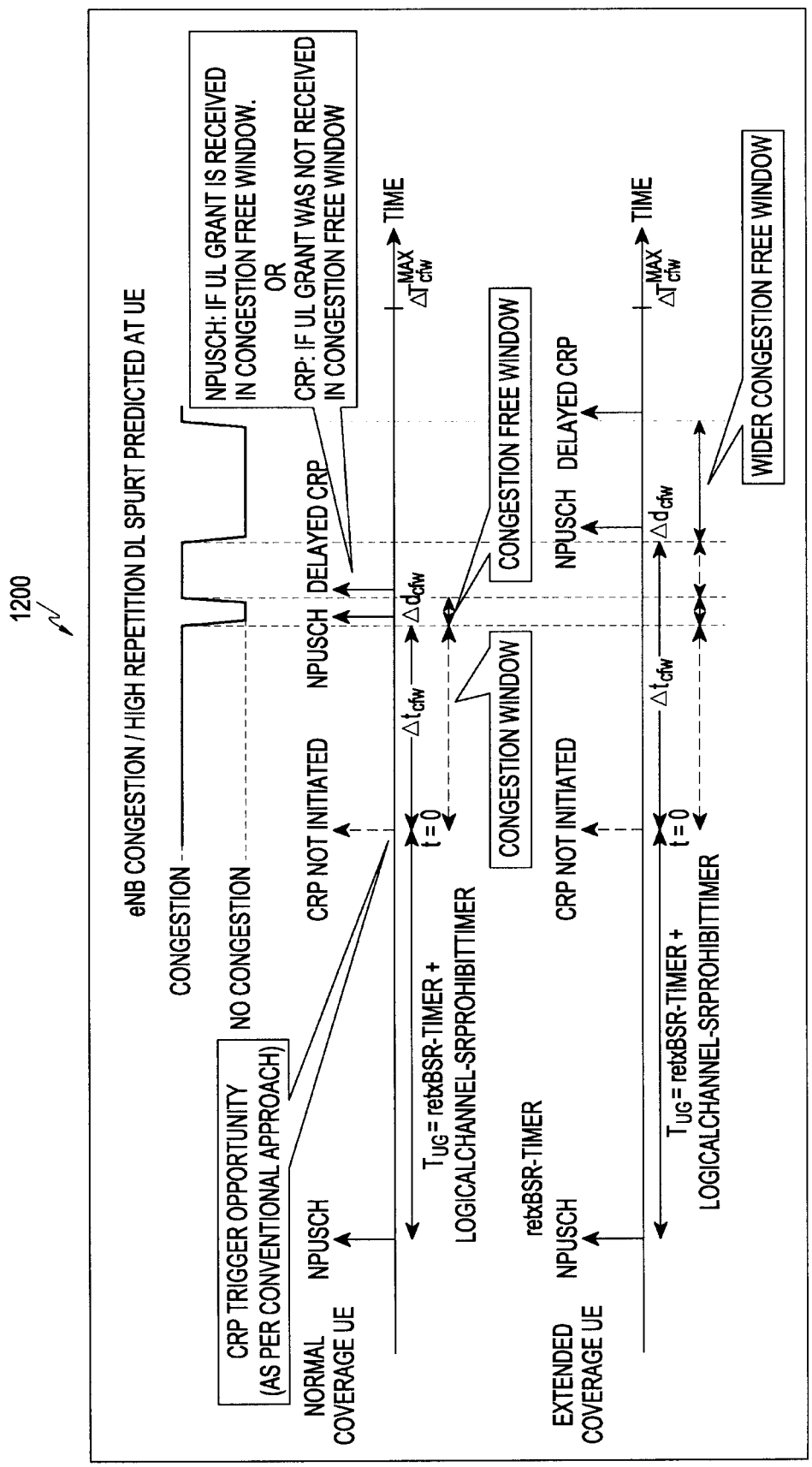
FIG. 12 illustrates an example graph in which predicted congestion free window requirement is depicted according to embodiments as disclosed herein.

Then, UE may extend the wait time for the requested uplink grant by an amount $\Delta t_{cfw}$ beyond $T_{UG}$ if below conditions are satisfied:

$$\Delta t_{cfw} < \Delta T_{cfw}^{MAX} \text{ and } \Delta d_{cfw} > D_{NPDCCH}^{MIN}$$

where: (1) C1 is to ensure that the battery saving in potential prevention of CRP with the provided method does not get eroded by the battery consumption in endless wait for the requested uplink grant. Thus, the maximum allowed extension in wait time ($\Delta T_{cfw}^{MAX}$) may be derived through simulation as the duration for which the battery consumption in decoding USS becomes equal to the battery consumed in doing a CRP; and
(2) C2 is to ensure that the NPDCCH can be contained within this congestion free window. Both conditions (C1 and C2) are illustrated in the FIG. 12. FIG. 12 is an example graph 1200 in which predicted congestion free window requirement is depicted.

Figure 10A:
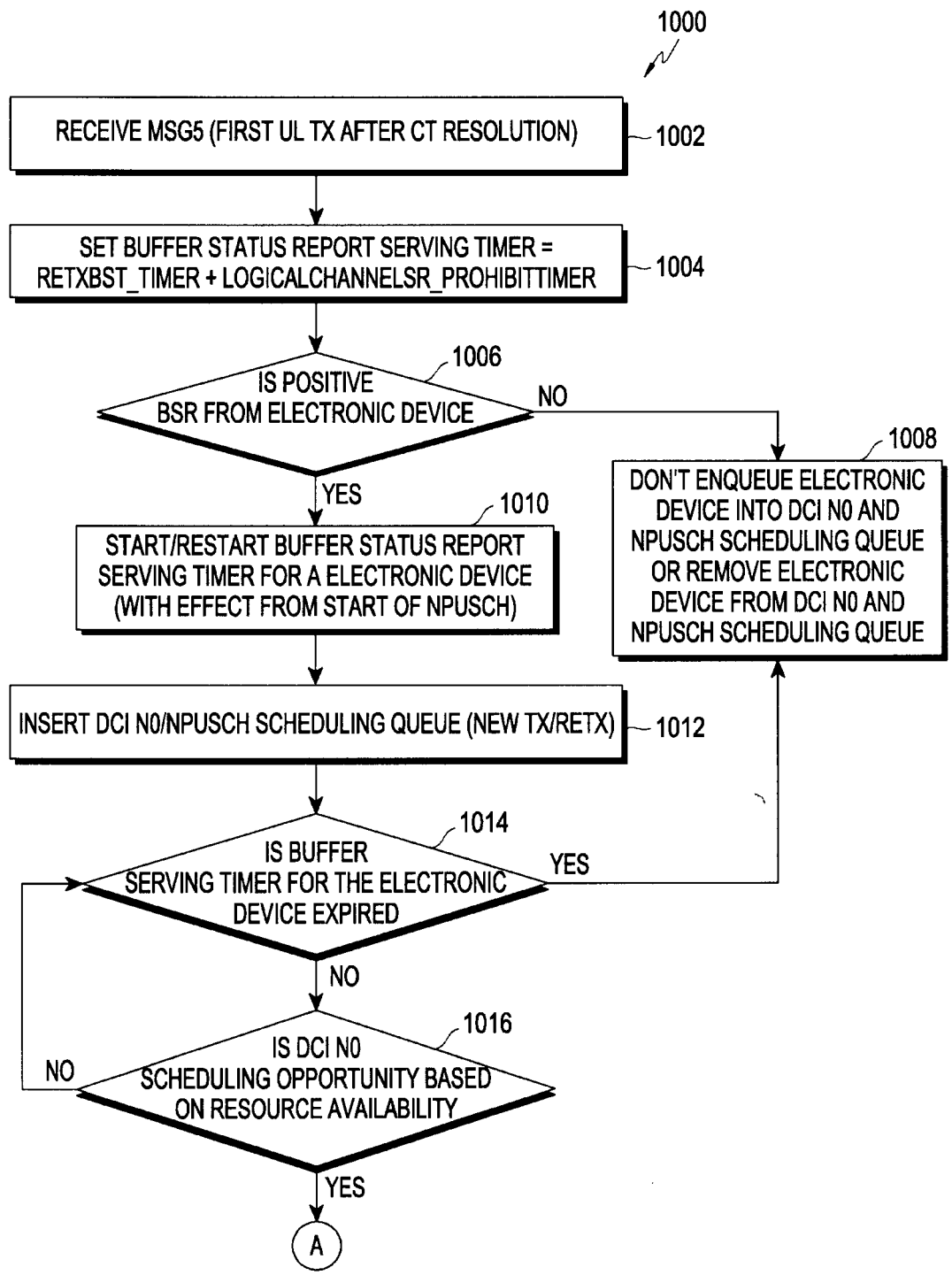
FIG. 10a and FIG. 10b are example flow diagrams illustrating detailed operations, implemented by the network entity, for managing the radio resource in the wireless communication network, according to embodiments as disclosed herein.
Figure 10B:
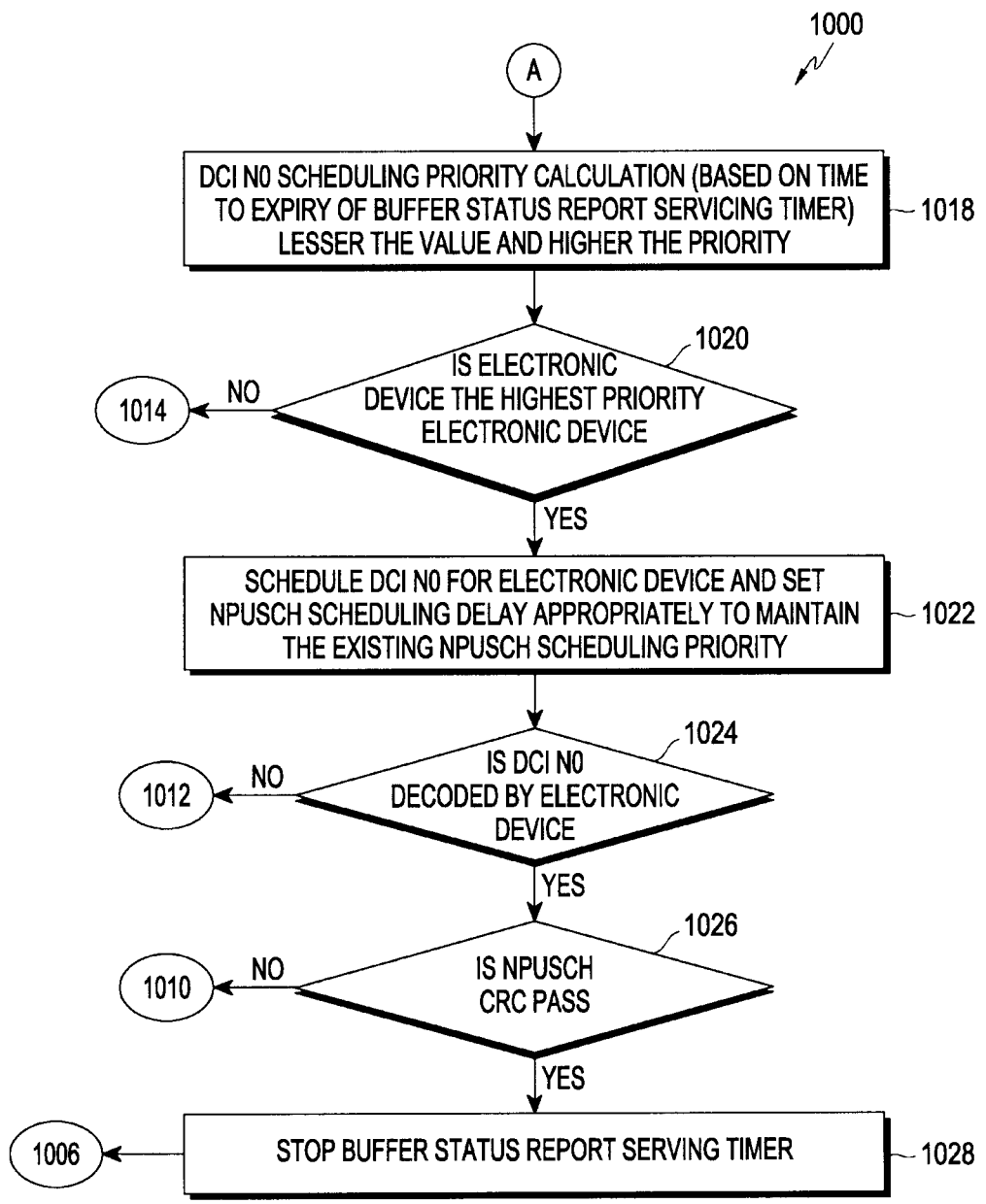

FIG. 10a and FIG. 10b are example flow diagrams 1000 illustrating detailed operations, implemented by the network entity 200, for managing the radio resource in the wireless communication network 300, according to an embodiment as disclosed herein.

At 1002, the method includes receiving the MSG5 (i.e., first UL transmission after core network terminal (CT) resolution). At 1004, the method includes setting the buffer status report serving timer. At 1006, the method includes determining the positive BSR received from the electronic device 100. If the positive BSR is received from the electronic device 100 then, at 1010, the method includes starting/restarting the buffer status report serving timer for the electronic device 100 (with effect from start of NPUSCH). If the positive BSR is not received from the electronic device 100 then, at 1008, the method does not enqueue the electronic device 100 into the DCIN0 and NPUSCH scheduling queue or removing the electronic device 100 from DCI N0 and NPUSCH scheduling queue.

At 1012, the method includes inserting the DCI N0/NPUSCH scheduling queue (while doing new transmission (Tx)/retransmission (reTx)). At 1014, the method includes determining whether the buffer serving timer for the electronic device 100 is expired. If the buffer serving timer for the electronic device 100 is expired then, the method performs the operation 1008. If the buffer serving timer for the electronic device 100 is not expired then, at 1016, the method includes determining whether the DCI N0 scheduling opportunity is based on the resource availability.

If the DCI N0 scheduling opportunity is not based on resource availability then, the method performs the operation 1014. If the DCI N0 scheduling opportunity is based on the resource availability then, at 1018, the method includes computing the DCI N0 scheduling priority (based on time to expiry of buffer status report servicing timer) lesser the value and higher the priority. At 1020, the method includes determining whether the electronic device 100 is a highest priority electronic device. If the electronic device 100 is the highest priority electronic device, then at 1022, the method includes scheduling the DCI N0 for the electronic device 100 and setting the NPUSCH scheduling delay appropriately to maintain the existing NPUSCH scheduling priority.

If the electronic device 100 is not the highest priority electronic device, then the method performs the operation 1014. At 1024, the method includes determining whether the DCI N0 is decoded by the electronic device 100. If the DCI N0 is decoded by the electronic device 100 then, at 1026, the method includes determining whether the NPUSCH CRC is passed. If the DCI N0 is not decoded by the electronic device 100 then, the method performs the operation 1012. If the NPUSCH CRC is passed then, at 1028, the method includes stopping the buffer status report serving timer. If the NPUSCH CRC is not passed then, the method performs the operation 1010. After stopping the buffer status report serving timer, the method again performs the operation 1006.

Figure 11:
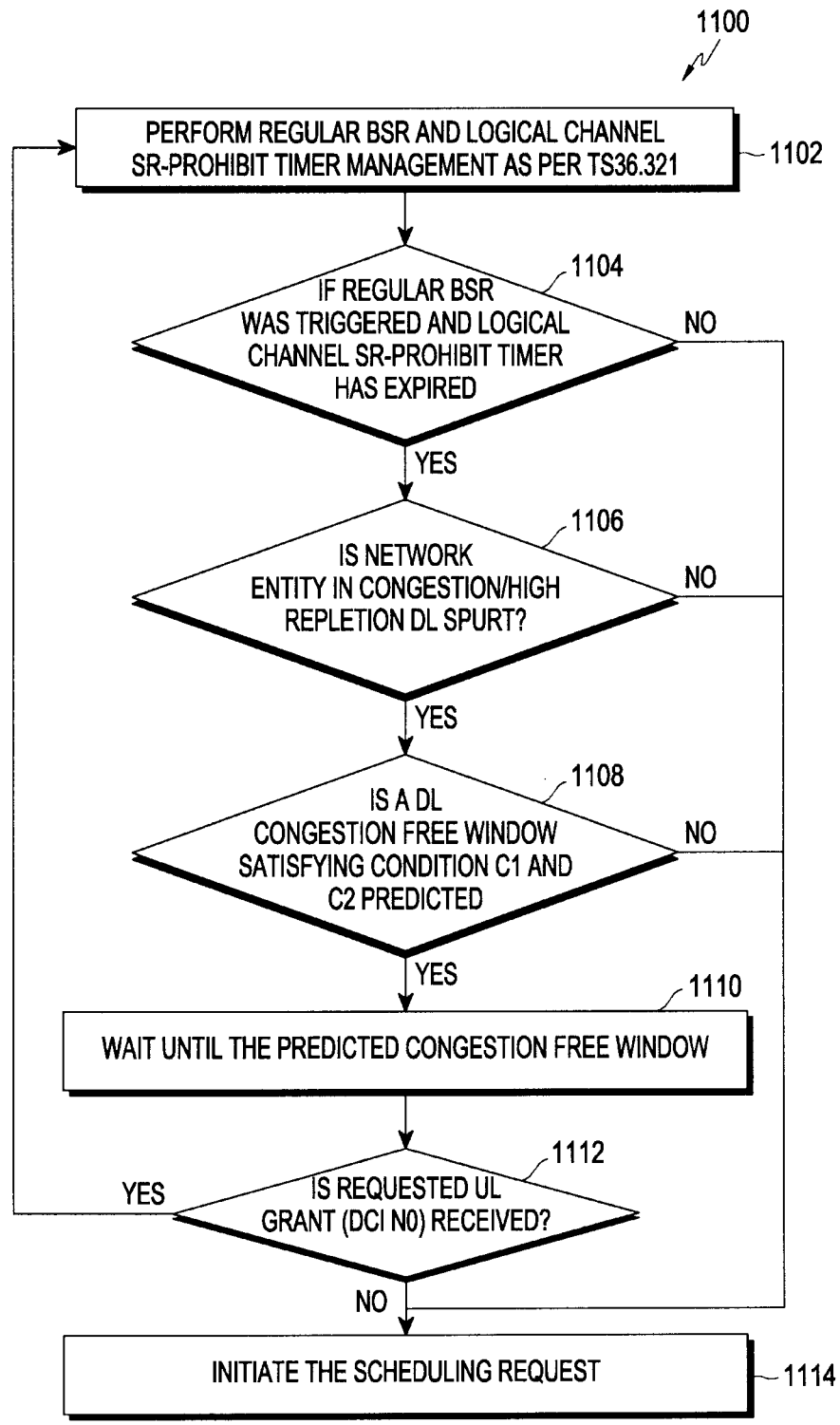
FIG. 11 is an example flow diagram illustrating detailed operations, implemented by the electronic device, for managing the radio resource in the wireless communication network, according to embodiments as disclosed herein.

FIG. 11 is an example flow diagram 1100 illustrating detailed operations, implemented by the electronic device 100, for managing the radio resource in the wireless communication network 300, according to an embodiment as disclosed herein. At 1102, the method includes perform the regular BSR and logical channel SR-prohibit timer management as per TS36.321. At 1104, the method includes determining whether the regular BSR was triggered and logical channel SR-prohibit timer has expired. If the regular BSR was triggered and the logical channel SR-prohibit timer has expired then, at 1106, the method includes determining whether the network entity 200 is in the congestion/high repletion DL spurt. If network entity 200 is not in the congestion/high repletion DL spurt then, the method performs the step 1114.

If network entity 200 is in the congestion/high repletion DL spurt then, at 1108, the method includes determining whether the DL congestion free window satisfies condition C1 and C2 (already explained in the FIG. 9). If the DL congestion free window does not satisfy the condition C1 and C2 then, the method performs the step 1114. If the DL congestion free window satisfies the condition C1 and C2 then, at 1110, the method includes waiting until the predicted congestion free window. At 1112, the method includes determining whether the requested UL grant (DCI N0) is received. If the requested UL grant (DCI N0) is received then, the method performs the step 1102. If the requested UL grant (DCI N0) is not received then, at 114, the method includes initiating the scheduling request.

The various actions, acts, blocks, steps, or the like in the flow diagrams 500, 600, 1000, and 1100 may be performed in the order presented, in a different order or simultaneously. Further, in some embodiments, some of the actions, acts, blocks, steps, or the like may be omitted, added, modified, skipped, or the like without departing from the scope of the disclosure.

The provided method can also be applicable to a second generation (2G) network, a third generation (3G) network, an LTE network and an LTE-A network wherever a physical random access channel (PRACH) and a physical uplink shared channel (PUSCH) processing occurs.

The embodiments disclosed herein can be implemented through at least one software program running on at least one hardware device and performing network management functions to control the elements. The elements can be at least one of a hardware device, or a combination of hardware device and software module.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of at least one embodiment, those skilled in the art will recognize that the embodiments herein can be practiced with modification within the scope of the embodiments as described herein.

Although the present disclosure has been described with various embodiments, various changes and modifications may be suggested to one skilled in the art. It is intended that the present disclosure encompass such changes and modifications as fall within the scope of the appended claims.

What is claimed is:

1. A method of a network entity for managing a radio resource in a wireless communication network, the method comprising:
   receiving, by a network entity, from an electronic device, a non-zero buffer status report;
   triggering a timer for the electronic device upon receiving the non-zero buffer status report from the electronic device;
   receiving, by the network entity, a narrowband physical random access channel (NPRACH) signal from the electronic device;
   determining, by the network entity, whether the timer expires;
   transmitting, to the electronic device, a random access response in response to the NPRACH signal; and
   determining, by the network entity, not to transmit an uplink grant for non-zero buffer status report upon the timer expiring.

2. The method as claimed in claim 1, further comprising:
   receiving, from the electronic device, a message comprising a cell-radio network temporary identifier (C-RNTI);
   transmitting, to the electronic device, downlink control information scrambled with the C-RNTI; and
   receiving, from the electronic device, a narrowband physical uplink shared channel (NPUSCH).

3. The method as claimed in claim 1, wherein a timer value of the timer is determined based on a retransmission buffer status report timer and a logical channel scheduling request (SR) prohibit timer.

4. The method as claimed in claim 1, further comprising receiving, from the electronic device, data packets when at least one of scheduling the uplink grant to the electronic device or prioritizing scheduling the uplink grant to the electronic device.

5. The method as claimed in claim 1, wherein the uplink grant is scheduled based on a user equipment (UE) specific search space (USS).

6. A method of an electronic device for managing a radio resource in a wireless communication network, the method comprising:
   transmitting, to a network entity, a non-zero buffer status report;
   activating a timer for the electronic device in response to transmitting, to the network entity, the non-zero buffer status report;
   determining, by the electronic device, that a timer value of the timer required for receiving an uplink grant from the network entity does not exceed a maximum extension threshold based on a determination that the uplink grant has not been received before expiry of the timer; and
   extending a timer value of the timer for receiving the uplink grant based on the determination that the timer value of the timer does not exceed the maximum extension threshold.

7. The method as claimed in claim 6, further comprising:
   determining whether a congestion free window for receiving the uplink grant accommodates narrowband physical downlink control channel (NPDCCH) repetitions required in a current coverage level; and
   extending the timer value of the timer for receiving the uplink grant based on a determination that the extension in the timer value required to reach the congestion free window does not exceed the maximum extension threshold and a determination that the congestion free window accommodates the NPDCCH repetitions required in the current coverage level.

8. The method as claimed in claim 6, further comprising:
   monitoring one or more events used as training sets for at least one of a machine learning model or an artificial intelligence (AI) model running at the electronic device; and
   identifying a congestion free window for receiving, from the network entity, the uplink grant based on the one or more events.

9. The method as claimed in claim 8, wherein the one or more events comprise at least one of:
   a buffer status report that is not indicated by the network entity;
   a delay in receiving downlink control information comprising the uplink grant corresponding to the buffer status report;
   a scheduling delay between a narrowband physical downlink control channel (NPDCCH) and a corresponding narrowband physical downlink shared channel (NPDSCH); or
   a position of received random access response (RAR) in a response window.

10. A network entity for managing a radio resource in a wireless communication system, the network entity comprising:
- a processor;
- memory; and
- a timer based resource managing controller coupled with the processor and the memory, the timer based resource managing controller configured to:
  - receive, from an electronic device, a non-zero buffer status report;
  - trigger a timer for the electronic device in response to receiving, from the electronic device, the non-zero buffer status report;
  - receive a narrowband physical random access channel (NPRACH) signal from the electronic device;
  - determine whether the timer expires;
  - transmit, to the electronic device, a random access response in response to the NPRACH signal; and
  - determine not to transmit an uplink grant for the electronic device upon the timer expiring.

11. The network entity as claimed in claim 10, wherein the timer based resource managing controller is further configured to:
- receive, from the electronic device, a message comprising a cell-radio network temporary identifier (C-RNTI);
- transmit, to the electronic device, downlink control information scrambled with the C-RNTI; and
- receive, from the electronic device, a narrowband physical uplink shared channel (NPUSCH).

12. The network entity as claimed in claim 10, wherein a timer value of the timer is determined based on a retransmission buffer status report timer and a logical channel scheduling request (SR) prohibit timer.

13. The network entity as claim in claim 10, wherein the timer based resource managing controller is further configured to receive, from the electronic device, data packets when at least one of scheduling the uplink grant to the electronic device or prioritizing scheduling the uplink grant to the electronic device.

14. The network entity as claim in claim 10, wherein the uplink grant is scheduled based on a user equipment (UE) specific search space (USS).

15. An electronic device for managing a radio resource in a wireless communication network, the electronic device comprising:
- a processor;
- memory; and
- a timer based resource managing controller coupled with the processor and the memory, the timer based resource managing controller configured to:
  - transmit, to a network entity, a non-zero buffer status report,
  - activate a timer for the electronic device in response to transmitting, to the network entity, the non-zero buffer status report,
  - determine, by the electronic device, that a timer value of the timer required for receiving an uplink grant from the network entity does not exceed a maximum extension threshold based on a determination that the uplink grant has not been received before expiry of the timer; and
  - extend a timer value of the timer for receiving the uplink grant based on the determination that the timer value of the timer does not exceed the maximum extension threshold.

16. The electronic device as claimed in claim 15, wherein the timer based resource managing controller is further configured to:
- determine whether a congestion free window for receiving the uplink grant accommodates narrowband physical downlink control channel (NPDCCH) repetitions required in a current coverage level; and
- extend the timer value of the timer for receiving the uplink grant based on a determination that an extension in the timer value required to reach the congestion free window does not exceed the maximum extension threshold and a determination that the congestion free window accommodates the NPDCCH repetitions required in the current coverage level.

17. The electronic device as claimed in claim 15, wherein the timer based resource managing controller is further configured to:
- monitor one or more events used as training sets for at least one of a machine learning model or an artificial intelligence (AI) model running at the electronic device; and
- identify a congestion free window for receiving, from the network entity, the uplink grant based on the one or more events.

18. The electronic device as claimed in claim 17, wherein the one or more events comprise at least one of:
- a buffer status report that is not indicated by the network entity;
- a delay in receiving downlink control information comprising the uplink grant corresponding to the buffer status report;
- a scheduling delay between a narrowband physical downlink control channel (NPDCCH) and a corresponding narrowband physical downlink shared channel (NPDSCH); or
- a position of received random access response (RAR) in a response window.

* * * * *